March 15, 1960     O. TINO     2,928,626
SUSTAINING AIRFOIL WITH RETRACTABLE CYLINDRICAL ROTOR
Filed Jan. 17, 1956     3 Sheets-Sheet 1
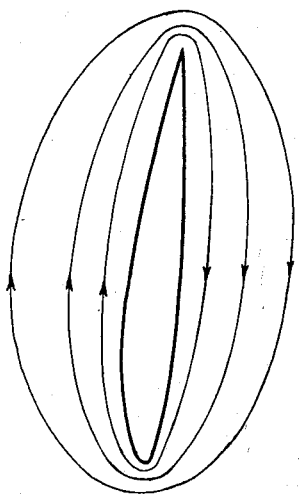
Figure 2
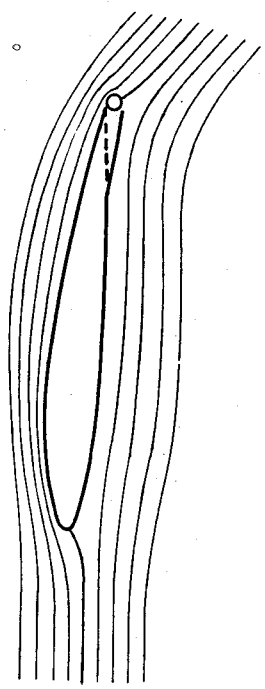
Figure 4
Figure 1
Figure 3

March 15, 1960        O. TINO        2,928,626
SUSTAINING AIRFOIL WITH RETRACTABLE CYLINDRICAL ROTOR
Filed Jan. 17, 1956        3 Sheets-Sheet 3

2,928,626

SUSTAINING AIRFOIL WITH RETRACTABLE CYLINDRICAL ROTOR

Ovid Tino, New York, N.Y.

Application January 17, 1956, Serial No. 559,672

11 Claims. (Cl. 244—10)

This invention relates to aerofoils for aircraft and it is a general object of the present invention to provide means that will substantially increase the lift coefficient of the aerofoils without an increase of the incidence angle.

It is generally known that the lift coefficient is approximately a linear function of the incidence angle and that, at certain angles depending upon the shape of the aerofoil, this function is no longer linear and has a maximum for a certain value of $\alpha$.

Fast aircraft have small wing areas with respect to their weight which means high load per unit surface of wing. This implies high landing and take-off velocities which would rapidly limit the flying velocity of the aircraft. Various devices have been invented and constructed in order to increase the lift coefficient for landing and take-off and today almost all existing aircraft are provided with one or two of the existing devices. Yet the necessity of a further increase of the lift coefficient is strongly felt and the present invention is intended to satisfy this demand.

General description

Theoretically, the lift force is caused by super-imposing a "Circulation" around the aerofoil to the velocity of the undisturbed fluid with respect to the aerofoil. The mathematical expression for the above statement is:

$$L = \rho . \Gamma . v_\infty . l$$

or per unit length of aerofoil:

$$L = \rho . \Gamma . v_\infty$$

where $L=$ lift, $\rho=$ density, $\Gamma=$ circulation, $v_\infty=$ velocity of undisturbed fluid.

In an ideal fluid, and without circulation, the streamlines passing in the neighborhood of an aerofoil would roughly have the shapes as represented in Fig. 1. As can be seen from the figure, the stagnation point at the leading edge is placed toward the pressure side of the aerofoil and the one at the trailing edge is placed on the suction side of the aerofoil. Integrating the pressure distribution over the contour of the aerofoil, it is seen that the integral vanishes and no lift is possible. In order to obtain a lift it is necessary to superpose a "Circulation" which is represented alone in Fig. 2. The result is then represented in Fig. 3, where it can be seen that the second stagnation point is placed at the trailing edge itself. In this case the value of the integral is different from zero, except for one value of $\alpha$ which is generally negative for unsymmetrical aerofoils. It is established that by further displacement of the rear stagnation point around the edge, toward the pressure side, a substantial lift increase is obtained without an increase of the incidence angle.

Using very powerful suction, a German scientist at the Gottingen Research Institute, was able to obtain this effect and to reach lift coefficients as high as 12.5. This was obtained only for small Reynolds numbers owing to the extremely large amount of fluid to be sucked at higher Reynolds numbers which rapidly limit the field of the system.

In the present invention the same effect is obtained by the use of a rotating cylinder placed at the trailing edge and driven by a compressed air turbine or an electrical motor. For optimal effect the tangential velocity of the cylinder must be of the order of four times the velocity of the undisturbed fluid.

The bearings of the cylinder are mounted on a carriage which allows the cylinder to be retracted in the wing when the action of the cylinder is not necessary, that is, in ordinary flying. The rear of the pressure side of the wing is mounted on hinges and opens downwardly to allow the cylinder to come out of the wing toward the trailing edge. The rear part remains open and acts as a flap thus adding to the lift increase. Between the cylinder and the so formed flap remains a gap through which fluid is sucked in order to reduce the whirl formation behind the cylinder and to assist the effect.

The phenomenon of displacing the stagnation point toward the pressure side of the areofoil is caused by the rotation of the cylinder. The action can be further assisted by the addition of a conventional flap.

The various objects and features of our present invention will be fully understood from the following detailed description, throughout which description reference is made to the accompanying drawings in which:

Fig. 1 represents the streamlines around an aerofoil in an ideal fluid.

Fig. 2 illustrates the "circulation" pattern around an aerofoil.

Fig. 3 represents a combination of the streamlines and the circulation lines around an aerofoil, that is, the "circulation" lines of Fig. 2, superposed on the lines of Fig. 1.

Fig. 4 represents the streamlines around an aerofoil provided with a rotating cylinder and thus explains the basic phenomenon involved in the present invention.

Figure 5:
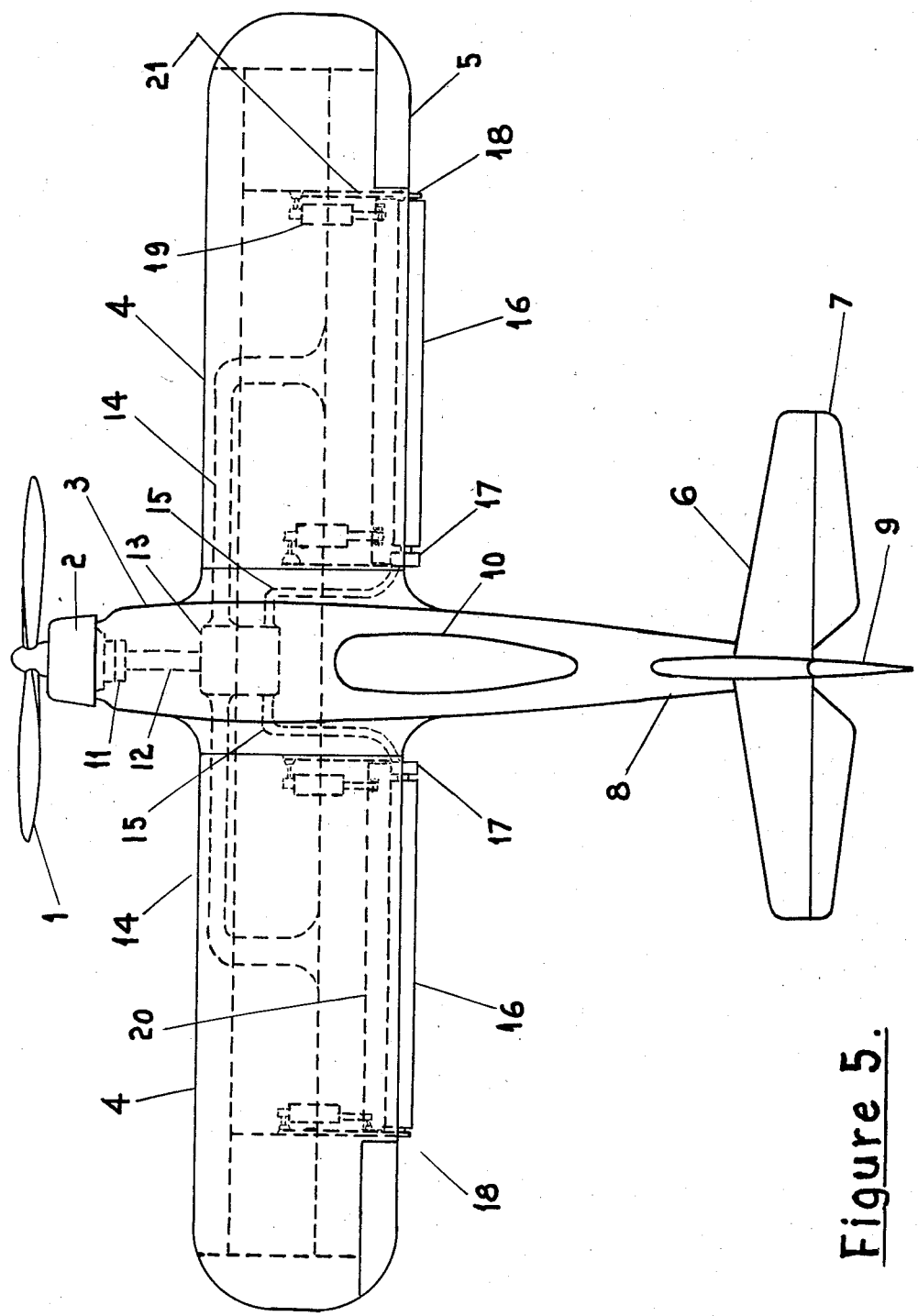
Fig. 5 is a general diagram illustrating the apparatus embodying the invention and shows the device in an operative or outside position.

The apparatus illustrated in Fig. 5 represents an aircraft provided with the device according to my invention and represents only one of the possible arrangements.

It involves in this particular case, a propeller 1, a radial engine 2, a fuselage 3, two wings 4, two ailerons 5, a tail 6, an elevator 7, rudder assembly 8 and 9, cockpit 10, a clutch 11 connecting engine 2 with vacuum pump and compressor unit 13, two suction pipes 14, two compressed air hoses 15, two cylinders 16 supported at one end on bearings 18 and at the other end on the axles of the compressed air turbines 17, four hydraulic motors for driving the carriage 20, and four guides 21 supporting the two carriages.

Figure 6:
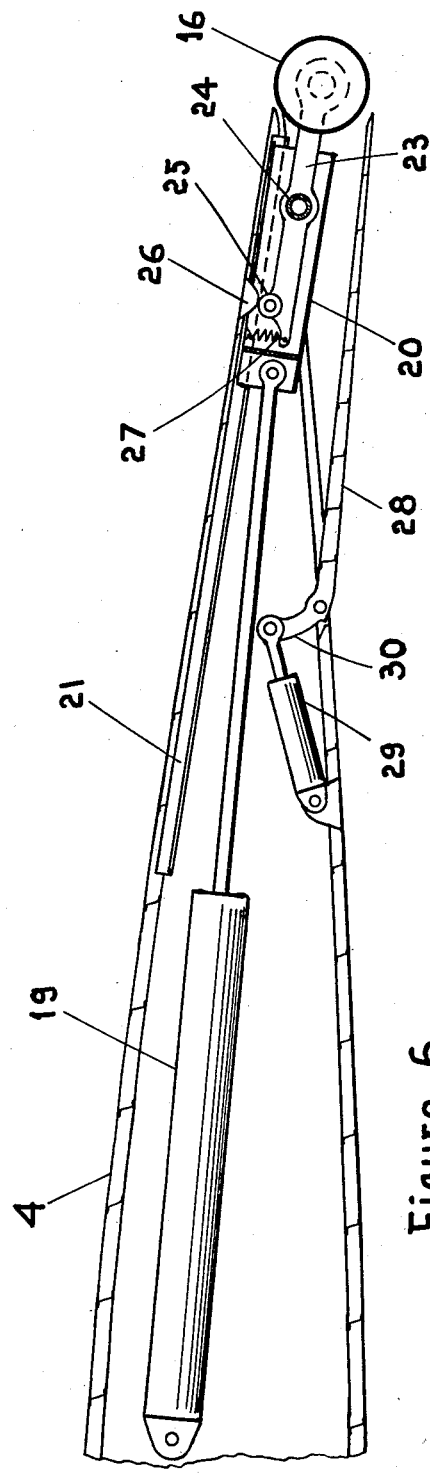
Fig. 6 is a sectional view of the rear part of the wing with my invention in its operative or open position.
Figure 7:
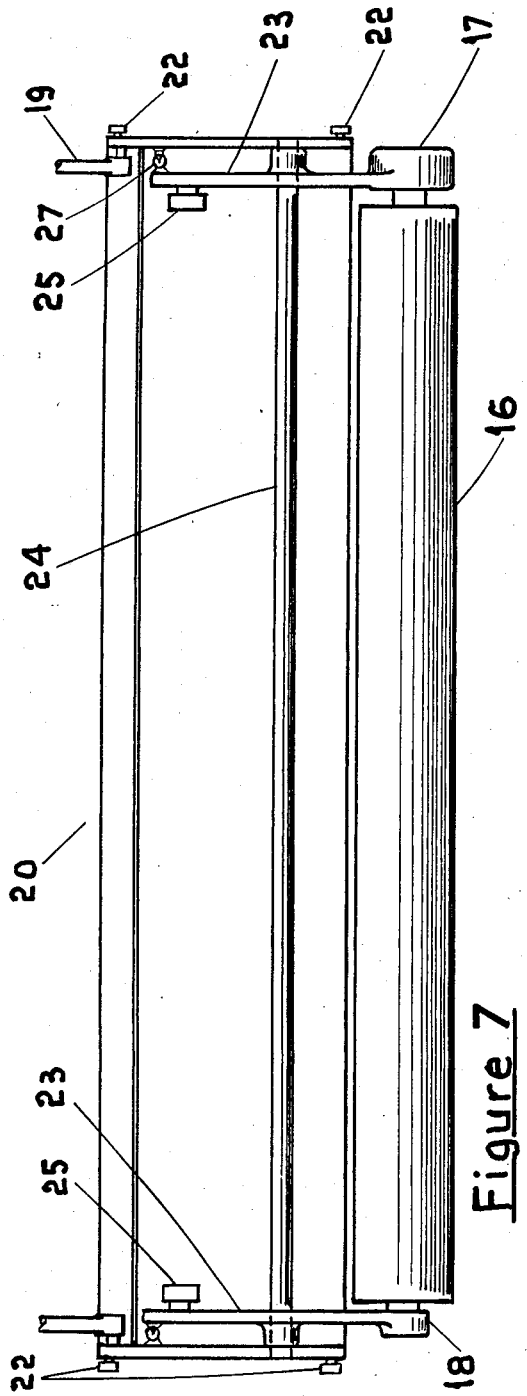
Fig. 7 is a view of the carriage assembly supporting the rotating cylinder.

In Fig. 6 the parts shown also in Fig. 5 are described by the same numbers. In addition, Fig. 6 shows: bearing lever 23 supported on axle 24, rollers 25 mounted on levers 23, cam 26 attached to the upper side of the wing, springs 27 attached at one end to the levers 23 and at the other end to the carriage 20. The under surface 28 of the rear part of the wing opens to allow the passage of the cylinder and the carriage, driven by means of hydraulic motors 29 and levers 30. The guiding rollers 22 belonging to the carriage assembly are shown in Fig. 7.

Functioning

The device is intended to be used only for the purpose of landing and take-off. During the normal flight the device becomes unnecessary and must be retracted into the wing and the flap closed to allow the wing to have the initial form of aerofoil.

Before starting a landing or take-off operation, the pilot, after having warmed up the engine of the aircraft, controls the operation of the hydraulic motors 29 and 19. Motors 29 move levers 30 to open the part 28, and then motor 19 pushes carriage 20 to the trailing end of wing 4, said carriage rolling on roller 22 in guides 21. Near the end position, cam 26 pushes downward one end of lever 23, the contact being made through roller 25 which raises cylinder 16 to its final position shown in Fig. 6. After the above described sequence, the pilot engages the clutch 11, which, by means of shaft 12, drives the vacuum pump-compressor unit 13, which starts to suck air through pipes 14 and the slot between cylinder 16 and part 28. At the same time the unit 13 compresses the required air for the turbines 17 which drive the cylinders 16. The pilot can now start and after the craft has reached sufficient speed and height, the device can be retracted into the wing, the operation sequences being now—First: disengage the clutch; second: operate motors 19, and third: operate motors 29.

The embodiments of the invention in which an exclusive property or privilege is claimed are defined as follows:

1. An aircraft sustentation device comprising a hollow airfoil having an opening in its lower surface adjacent its trailing edge, a member mounted on the lower side of said airfoil and adjustable between a first position wherein it closes said opening and a second position wherein it defines, with the upper trailing portion of said airfoil, a trailing edge slot, motor means interconnecting said airfoil and said member for adjusting said member between said first and second positions, guide means in said airfoil, carriage means engaging said guide means for chordwise movement relative to said guide means; levers mounted on said carriage means for pivoting about a spanwise axis, a spanwise extending cylinder at the trailing ends of said levers, said cylinder being rotatably mounted on said levers for rotation about the cylinder axis, means drivingly engaging said cylinder for rotating said cylinder, motor means interconnecting said carriage means and said airfoil for displacing said carriage means along said guide means whereby said cylinder may be displaced between a retracted position within the airfoil and a projected position at a slot formed in the trailing edge of the airfoil, cam means on said airfoil, follower means on the forward ends of said levers engageable with said cam means and arranged to position said cylinder in spaced relation to the sides of said slot when said cylinder is in projected position, and suction means communicating with the interior of said airfoil, whereby during landing and take-off said member may be adjusted to open position, said suction means may be actuated to suck in boundary layer air through said slot, and said cylinder may be rotated in its projected position.

2. An aircraft sustentation device comprising a hollow airfoil having an opening in its lower surface adjacent its trailing edge, a member mounted on the lower side of said airfoil and adjustable between a first position wherein it closes said opening and a second position wherein it defines, with the upper trailing portion of said airfoil, a trailing edge slot, motor means interconnecting said airfoil and said member for adjusting said member between said first and second positions, guide means in said airfoil, carriage means engaging said guide means for chordwise movement relative to said guide means; levers mounted on said carriage means for pivoting about a spanwise axis, a spanwise extending cylinder at the trailing ends of said levers, said cylinder being rotatably mounted on said levers for rotation about the cylinder axis, means drivingly engaging said cylinder for rotating said cylinder, motor means interconnecting said carriage means and said airfoil for displacing said carriage means along said guide means whereby said cylinder may be displaced between a retracted position within the airfoil and a projected position at a slot formed in the trailing edge of the airfoil, and suction means communicating with the interior of said airfoil, whereby during landing and take-off said member may be adjusted to open position, said suction means may be actuated to suck in boundary layer air through said slot, and said cylinder may be rotated in its projected position.

3. An aircraft sustentation device comprising an airfoil, guide means in said airfoil, carriage means engaging said guide means for chordwise movement relative to said guide means; levers mounted on said carriage means for pivoting about a spanwise axis, a spanwise extending cylinder at the trailing ends of said levers, said cylinder being rotatably mounted on said levers for rotation about the cylinder axis, means drivingly engaging said cylinder for rotating said cylinder, motor means interconnecting said carriage means and said airfoil for displacing said carriage means along said guide means whereby said cylinder may be displaced between a retracted position within the airfoil and a projected position at a slot formed in the trailing edge of the airfoil, and suction means communicating with the interior of said airfoil, whereby during landing and take-off said member may be adjusted to open position, said suction means may be actuated to suck in boundary layer air through said slot, and said cylinder may be rotated in its projected position.

4. An aircraft sustentation device comprising a hollow airfoil having an opening in its lower surface adjacent its trailing edge, a member mounted on said airfoil, motor means interconnecting said airfoil and said member for adjusting said member, carriage means for movement relative to said airfoil; levers mounted on said carriage means for pivoting about an axis, an extending cylinder at the trailing ends of said levers, said cylinder being rotatably mounted on said levers for rotation about the cylinder axis, means drivingly engaging said cylinder for rotating said cylinder, motor means interconnecting said carriage means and said airfoil for displacing said carriage means whereby said cylinder may be displaced between a retracted position within the airfoil and a projected position at the trailing edge of the airfoil, said rotatable cylinder being disposed in a span-wise direction parallel to and, when in extended position, spaced slightly aft of the trailing edge of said airfoil.

5. In combination, a rotating cylinder supported by a carriage in a wing, a suction-compressor compressed air turbine for driving said cylinder, a hydraulic motor for positioning said cylinder, a cam fixed on said wing and an oscillating lever having a bearing therein mounted on said carriage, said cylinder being mounted in said bearing on said oscillating lever, said cylinder extendible beyond and retractable into the wing, said carriage travelling on a roller on a guide fixed inside said wing, the lower part of said wing opening by means of a second hydraulic motor acting on a second lever attached to said part of said wing to allow said carriage to move into an extended position, a gap being left between said cylinder and said lower part of wing whereby to permit suction of the boundary layer of air and thereby assist the lift increase, the position of said cylinder being controlled by said cam coacting with said oscillating lever supporting said cylinder, said rotating cylinder being positioned span-wise of the wing and, when in an extended position, spaced slightly aft of the trailing edge.

6. In combination, a rotating cylinder supported by a carriage in a wing, a suction-compressor compressed air turbine for driving said cylinder, a hydraulic motor for positioning said cylinder, a cam fixed on said wing and an oscillating lever having a bearing therein mounted on said carriage, said cylinder being mounted on said oscillating lever, said cylinder extendible beyond and retractable into the wing, said carriage travelling inside said wing, a part of said wing opening by means of a second hydraulic motor acting on a second lever attached to said part of said wing to allow said carriage to move into an extended position, a gap being left between said cylinder and said lower part of wing whereby to permit suction of the boundary layer of air and thereby assist the lift increase, the position of said cylinder being controlled by said cam coacting with said oscillating lever supporting said cylinder, said rotating cylinder being disposed in a span-wise direction and, when in extended position, spaced slightly aft of the trailing edge of said wing.

7. In combination, a rotating cylinder supported by a carriage in a wing, a compressed air turbine for driving said cylinder, a hydraulic motor for positioning said cylinder, a cam fixed on said wing and an oscillating lever mounted on said carriage, said cylinder being mounted in said wing, said cylinder extendible beyond and retractable into the wing, the lower part of said wing opening by means of a second hydraulic motor to allow said carriage to move into an extended position, a gap being left between said cylinder and said lower part of wing whereby to permit suction of the boundary layer of air and thereby assist the lift increase, the position of said cylinder being controlled by said cam, coacting with said oscillating lever supporting said cylinder, said rotating cylinder being positioned span-wise of the wing and, when in extended position, spaced slightly aft of the trailing edge.

8. In combination, a rotating cylinder supported by a carriage in a wing, a compressed air turbine for driving said cylinder, a hydraulic motor for positioning said cylinder, said cylinder being mounted on said wing and being extendible beyond and retractable into the wing, the lower part of said wing opening by means of a second hydraulic motor to allow said carriage to move into an extended position, a gap being left between said cylinder and said lower part of wing whereby to permit suction of the boundary layer of air and thereby assist the lift increase, said rotating cylinder being disposed in a span-wise direction and, when in extended position, spaced slightly from the trailing edge of said wing.

9. In combination, a rotating cylinder supported by a wing, a compressed air turbine for driving said cylinder, and a hydraulic motor for positioning said cylinder, said cylinder being mounted on said wing and being extendible beyond and retractable into the wing, said rotating cylinder being disposed in a span-wise direction parallel to and, when in extended position, spaced slightly aft of the trailing edge of said wing.

10. An aircraft sustentation device comprising a hollow airfoil having an opening in its lower surface adjacent its trailing edge, a flap member mounted on said airfoil, means connecting said airfoil and said member for adjusting said member, a second means for movement relative to said airfoil; an extendible cylinder at the trailing ends of said airfoil, said cylinder being rotatably mounted for rotation about the cylinder axis, means drivingly engaging said cylinder for rotating said cylinder, said second means interconnecting said cylinder and said airfoil for displacing said cylinder so that it may be displaced between a retracted position within the airfoil and a projected position at the trailing edge of the airfoil, said rotatable cylinder being disposed in a span-wise direction in relation to said airfoil and, when in extended position, spaced slightly behind the trailing edge of said airfoil.

11. In combination, a rotatable cylinder supported by a wing, means for driving said cylinder, said cylinder being mounted on said wing and being extendible beyond and retractable into the wing, and means for displacing said cylinder between extended and retracted positions, said rotatable cylinder being disposed in a span-wise direction in relation to said wing and, when in extended position, spaced slightly behind the trailing edge of said wing.

References Cited in the file of this patent

UNITED STATES PATENTS

| | | |
|---|---|---|
| 1,927,538 | Zaparka | Sept. 19, 1933 |
| 1,979,298 | Trey | Nov. 6, 1934 |